United States Patent
Lee et al.

(10) Patent No.: US 7,438,442 B2
(45) Date of Patent: Oct. 21, 2008

(54) LIGHT EMITTING PACKAGE, BACKLIGHT UNIT AND LIQUID CRYSTAL DISPLAY DEVICE INCLUDING THE SAME

(75) Inventors: Chang Ho Lee, Goomi-si (KR); In Ho Ahn, Daegu-si (KR); Pu Jin Kim, Goomi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/436,161

(22) Filed: May 17, 2006

(65) Prior Publication Data

US 2007/0081330 A1    Apr. 12, 2007

(30) Foreign Application Priority Data

Oct. 12, 2005   (KR) ........................ 10-2005-0095880
Apr. 25, 2006   (KR) ........................ 10-2006-0036995

(51) Int. Cl.
*F21V 5/02* (2006.01)
(52) U.S. Cl. .................... 362/295; 362/800; 362/251
(58) Field of Classification Search ............ 315/185 R, 315/160, 291; 362/800, 244, 231
See application file for complete search history.

(56) References Cited

U.S. PATENT DOCUMENTS

| | | | | |
|---|---|---|---|---|
| 4,573,766 | A | * | 3/1986 | Bournay et al. ............... 349/65 |
| 5,598,068 | A | * | 1/1997 | Shirai ..................... 315/185 R |
| 6,033,087 | A | * | 3/2000 | Shozo et al. ................ 362/244 |
| 6,897,623 | B2 | * | 5/2005 | Yoneda et al. .............. 315/291 |
| 7,178,971 | B2 | * | 2/2007 | Pong et al. .................. 315/291 |
| 7,196,481 | B2 | * | 3/2007 | Bushell et al. .............. 315/291 |

\* cited by examiner

*Primary Examiner*—Anabel M Ton
(74) *Attorney, Agent, or Firm*—Brinks Hofer Gilson & Lione

(57) ABSTRACT

A light emitting package is disclosed that can generate a white light while controlling Red, Green and Blue light emitting diodes ("LEDs") simultaneously. In the light emitting package, a plurality of LEDs are connected in series to one another. The plurality of LEDs are responsive to one driving voltage. Currents flowing through the plurality of LEDs are controlled by a current adjuster. Consequently, the plurality of LEDs are driven by the currents different from one another in amount.

10 Claims, 7 Drawing Sheets

130

LIGHT EMITTING PACKAGE, BACKLIGHT UNIT AND LIQUID CRYSTAL DISPLAY DEVICE INCLUDING THE SAME

This application claims the benefit of Korean Patent Application Nos. 10-2005-0095880 and 10-2006-0036995, each filed on Oct. 12, 2005 and Apr. 25, 2006, in the Korean Intellectual Property Office, the disclosure of which is incorporated herein in its entirety by reference.

BACKGROUND

DESCRIPTION OF THE RELATED ART

A liquid crystal display ("LCD") device displays an image by controlling the light transmittance of a liquid crystal. Such an LCD includes a backlight unit for providing surface light to a liquid crystal panel that can control the light transmittance for each pixel region. To provide uniform surface light to the liquid crystal panel, the backlight unit includes a light source for emitting light and a plurality of light path control sheets for distributing the emitted light uniformly.

A cold cathode fluorescent lamp ("CCFL") is widely used as the light source for the backlight unit. The CCFL enables electrons to be emitted from the electrode by high voltage supplied between two electrodes facing each other. The emitted electrons excite mercury injected into the lamp to produce ultraviolet light. The ultraviolet light stimulates phosphors coated on the inside of the lamp and visible light is emitted from the phosphors. A related art backlight unit using the CCFL is illustrated in FIG. 1.

Referring to FIG. 1, the related art backlight unit includes a plurality of CCFLs 1 for emitting light, a cover bottom member 3 for fixing and supporting the CCFLs 1, and optical sheets 5a, 5b and 5c disposed between the CCFLs 1 and a liquid crystal panel (not shown). The optical sheets 5a, 5b and 5c prevent light from being projected on the surface of the liquid crystal panel in a form of the CCFLs 1 and provide uniform brightness entirely. To increase a light scattering effect, the prism sheets 5b and 5b and the diffusion sheet 5a are disposed between the CCFLs 1 and the liquid crystal panel. A reflection plate 7 on the inner surface of the cover bottom member 3 reflects the light from the CCFLs 1 toward the liquid crystal panel, thereby improving the light utilization. Electrode interconnections 9a and 9b are provided at both electrodes (not shown) of each CCFL 1, respectively. An external voltage for driving the lamp is supplied through the electrode interconnections 9a and 9b.

Such a backlight unit serves as a light source for an image display. Specifically, the light from the CCFLs passes through the optical sheets 5a, 5b and 5c to produce a white light with high brightness. The liquid crystal panel disposed on the backlight unit adjusts the light transmittance by changing the arrangement of liquid crystal molecules injected thereinto. At the same time, a desired full-color image is displayed by mixing three primary colors (red (R), green (G), and blue (B)) using color filters (not shown). In other words, a desired image can be displayed by passing the light (white light) emitted from the backlight unit through the R, G and B color filters.

The backlight unit implements uniform brightness and high luminance by using the CCFLs 1, the optical sheets 5a, 5b and 5c, and the reflection plate 7 together. However, it may not be suitable for large-sized LCDs. Also, a high voltage must be supplied to an anode of the CCFL 1 so as to emit electrons, and the light efficiency is reduced by increased heat. Further, it is problematic that mercury is toxic and seriously harmful to the environment.

A backlight unit using a light emitting diode (LED) instead of the CCFL has certain advantages. As illustrated in FIG. 2, the related art backlight unit includes a light source 11 with a plurality of R, G and B LEDs, a cover bottom member 13 for fixing and supporting the light source 11, and optical sheets 15a, 15b and 15c disposed between the light source 11 and a liquid crystal panel (not shown). The optical sheets 15a, 15b and 15c prevent light from being projected on the surface of the liquid crystal panel in the form of the light source 11 and provide uniform brightness entirely. To increase a light scattering effect, the prism sheets 15b and 15b and the diffusion sheet 15a are disposed between the light source 11 and the liquid crystal panel. A reflection plate 17 is disposed in the inner surface of the cover bottom member 13 to reflect the light from the light source 11 to the liquid crystal panel, thereby improving the light utilization. The light source 11 includes a plurality of light emitting packages 14 arranged in a line as illustrated in FIG. 3. Each of the light emitting packages 14 includes one R LED 12a, two G LEDs 12b, and one B LED 2c.

Generally, the R, G and B LEDs 12a, 12b and 12c of the light emitting package 14 are individually controlled because they have device characteristics different from one another. For example, different voltages may be supplied to the respective LEDs 12a, 12b and 12c so as to make the same current flow through the respective LEDs 12a, 12b and 12c. Even if the same current flows due to the device characteristics of the respective LEDs 12a, 12b and 12c, light having different brightness is generated. Therefore, in order to generate a white light having a necessary white balance, the currents flowing through the R, G and B LEDs 12a, 12b and 12c are adjusted so that the R, G and B LEDs 12a, 12b and 12c are individually controlled.

As illustrated in FIG. 4, the R, G and B LEDs 12a, 12b and 12c from a related art device are individually driven. The R LED 12a is supplied with a voltage (Vin-R) from an R LED voltage generator 20a and generates light whose intensity corresponds to the current flowing through the R LED 12a. The G LED 12b is supplied with a voltage (Vin-G) from a G LED voltage generator 20b and generates light whose intensity corresponds to the current flowing through the G LED 12b. The B LED 12c is supplied with a voltage (Vin-B) from a B LED voltage generator 20c and generates light whose intensity corresponds to the current flowing through the B LED 12c. The light generated from the R, G and B LEDs 12a, 12b and 12c are incident onto the liquid crystal panel (not shown) to display a desired image.

In such a backlight unit, the R, G and B LEDs 12a, 12b and 12c must be individually driven so as to generate a white light with a required white balance. For this purpose, the R, G and B LED voltage generators 20a, 20b and 20c corresponding to the R, G and B LEDs 12a, 12b and 12c are individually provided.

Consequently, the driver circuit of the light emitting packages 14 becomes complex and the manufacturing cost increases.

SUMMARY

The present embodiments are directed to a light emitting package, a backlight unit and a liquid crystal display device implementing the light emitting package and backlight unit.

In one embodiment, a light emitting package includes a plurality of light emitting diodes (LEDs) connected in series and a current adjuster coupled with the plurality of LEDs.

In another embodiment, a backlight unit includes a plurality of circuit boards and a plurality of light emitting packages disposed at the respective circuit boards. The light emitting packages include a plurality of light emitting diodes connected in series and a current adjuster coupled with the plurality of LEDs.

In a further embodiment, a liquid crystal display device includes a backlight unit having a plurality of circuit boards. The device further includes a plurality of light emitting packages disposed at the respective circuit boards. The light emitting packages include a plurality of light emitting diodes connected in series and include a current adjuster coupled with the plurality of LEDs. The liquid crystal display device further includes a liquid crystal panel for displaying an image by adjusting a transmittance of a white light generated from the backlight unit.

In a further embodiment, a light emitting package includes a voltage generator for generating an input voltage. In addition, the light emitting package includes a plurality of light emitting diodes ("LEDs") coupled with the voltage generator and a current adjuster coupled with the plurality of LEDs. The LEDs are arranged in series and receive the input voltage and the current adjuster controls currents flowing through the plurality of LEDs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts.

Figure 5:
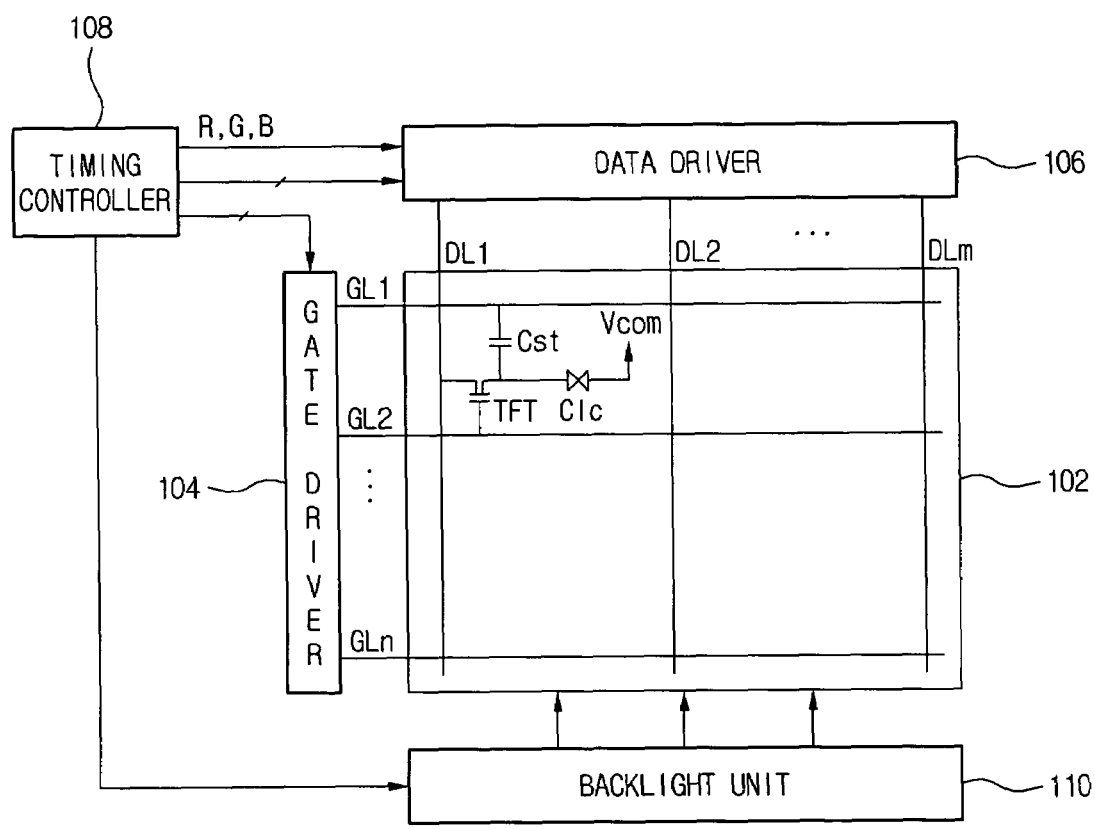
FIG. 5 is a view of an LCD according to an embodiment.

FIG. 5 is a view of a Liquid Crystal Disaply ("LCD") according to the present invention. Referring to FIG. 5, the LCD according to one embodiment includes a liquid crystal panel 102 in which a plurality of gate lines GL0, GL1 to GLn and a plurality of data lines DL1, DL2 to DLm are arranged and on which an image is displayed, a gate driver 104 and a data driver 106 for driving the liquid crystal panel 102, and a timing controller 108 for controlling the gate driver 104 and the data driver 106, and a backlight unit 110 for generating light to be projected to the liquid crystal panel 102.

In the liquid crystal panel 102, the gate lines GL0 to GLn and the data lines DL1 to DLm are arranged, and thin film transistors ("TFTs") acting as switching elements are disposed at the defined regions thereby. The TFTs have gate electrodes electrically connected to the gate lines GL0 to GLn, source electrodes electrically connected to the data lines DL1 to DLm, and drain electrodes electrically connected to pixel electrodes (not shown).

The TFTs are turned on when scan signals (specifically, gate high voltages ("VGH")) are supplied to the gate lines GL0 to GLn, and the TFTs are turned off when gate low voltages ("VGL") are supplied. Also, when the TFTs are turned on, data voltages on the data lines pass through the source and drain electrodes of the TFTs and are supplied to the pixel electrodes. The data voltages are retained at the pixel electrodes until the gate high voltages (VGH) are supplied at a next frame.

The gate driver 104 sequentially supplies the scan signals (specifically, the gate high voltages ("VGH")) to the gate lines GL0 to GLn in response to gate control signals generated from the timing controller 108.

The data driver 106 supplies the data voltages to the data lines DL1 to DLm in response to data control signals generated from the timing controller 108. Also, the data driver 106 converts R, G and B data signals from the timing controller 108 into analog data voltages.

The timing controller 108 generates the gate control signals for controlling the gate driver 104 and the data control signals for controlling the data driver 106 by using vertical/horizontal sync signals ("Vsync"/"Hsync"), a data enable signal DE, and a clock signal, which are supplied from an external system (none of which are shown). Also, the timing controller 108 arrays R, G and B data by one line and then supplies them to the data driver 106. The R, G and B data is supplied from the system in units of frames.

The backlight unit 110 generates light to be irradiated onto the liquid crystal panel 102. The generation of the light is controlled by the control signals generated from the timing controller 108. The backlight unit 110 includes a plurality of optical sheets, a reflection plate, and a light source. Also, the light source of the backlight unit 110 includes a plurality of light emitting packages having R, G and B LEDs and an LED voltage generator for generating a driving voltage for driving the R, G and B LEDs. It is preferable that the R, G and B LEDs of the light emitting package emit the light commonly in response to a single driving voltage from the LED voltage generator. The light emitting package 112 connected to the LED voltage generator 120 can be expected as the light source having the light emitting package that can be driven in response to a single driving voltage.

Figure 6:
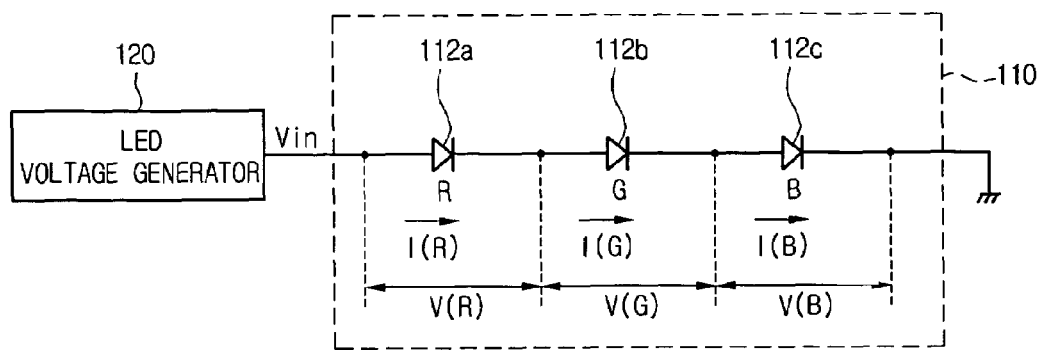
FIG. 6 is a circuit diagram of a light emitting package with R, G and B LEDs.

Referring to FIG. 6, the light emitting package 112 includes R, G and B LEDs 112a, 112b and 112c connected in series. An input voltage Vin generated from the LED voltage generator 120 is supplied to a serial circuit of the seriallyconnected R, G and B LEDs 112a, 112b and 112c. Due to the R LED 112a, the input voltage Vin from the LED voltage generator 120 is primarily attenuated as much as the driving voltage V(R) of the R LED 112a. The primarily attenuated voltage Vin-V(R) is supplied to the serial circuit of the G and B LEDs 112b and 112c. Due to the G LED 112b, the primarily attenuated voltage Vin-V(R) is secondary attenuated as much as the driving voltage V(G). The secondary attenuated voltage Vin-V(R)-V(G) is supplied to the B LED 112c. Consequently, voltages with different levels are supplied to the R, G and B LEDs 112a, 112b and 112c. On the contrary, the same amount of a current flows through the R, G and B LEDs 112a, 112b and 112c because they are connected in series.

The R, G and B LEDs 112a, 112b and 112c exhibit different device characteristics, considering the supplied voltages are different even if the same current is supplied to the R, G, and B LEDs 112a, 112b and 112c. The characteristic difference of the R, G and B LEDs 112a, 112b and 112c can be seen from Table 1 below. Table 1 shows device characteristics of the R, G and B LEDs 112a, 112b and 112c using a current, a voltage and a power.

TABLE 1

| I(mA) | Red LED | | Green LED | | Blue LED | |
|---|---|---|---|---|---|---|
| | V(V) | P(W) | V(V) | P(W) | V(V) | P(W) |
| 50 | 1.92 | 0.096 | 2.69 | 0.135 | 2.91 | 0.146 |
| 100 | 1.99 | 0.199 | 2.8 | 0.28 | 3.0 | 0.3 |
| 150 | 2.04 | 0.306 | 2.86 | 0.429 | 3.04 | 0.456 |
| 200 | 2.08 | 0.416 | 2.89 | 0.578 | 3.06 | 0.612 |
| 250 | 2.12 | 0.53 | 2.93 | 0.733 | 3.08 | 0.770 |
| 300 | 2.15 | 0.645 | 2.95 | 0.885 | 3.10 | 0.930 |
| 350 | 2.18 | 0.763 | 2.98 | 1.043 | 3.13 | 1.10 |

As can be seen from Table 1, assuming that the same current flows through the R, G and B LEDs 112a, 112b and 112c, different voltages V are supplied to the R, G and B LEDs 112a, 112b and 112c. For example, to make a current of 50 mA flow through the R, G and B LEDs 112a, 112b and 112c, 1.92 V, 2.69 V, and 2.91 V must be supplied to the R, G and B LEDs 112a, 112b and 112c, respectively.

Figure 1:
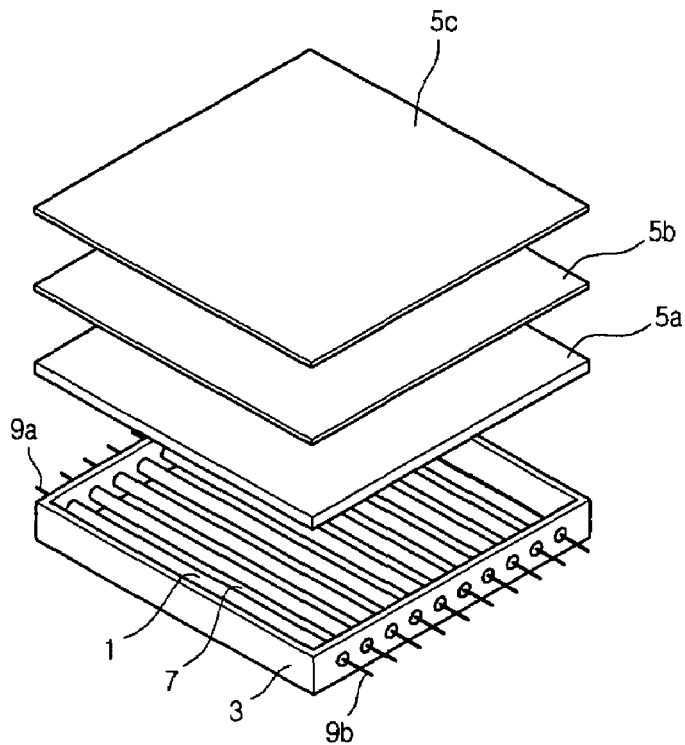
FIG. 1 is an exploded perspective view of a related art black light unit with a CCFL.
Figure 2:
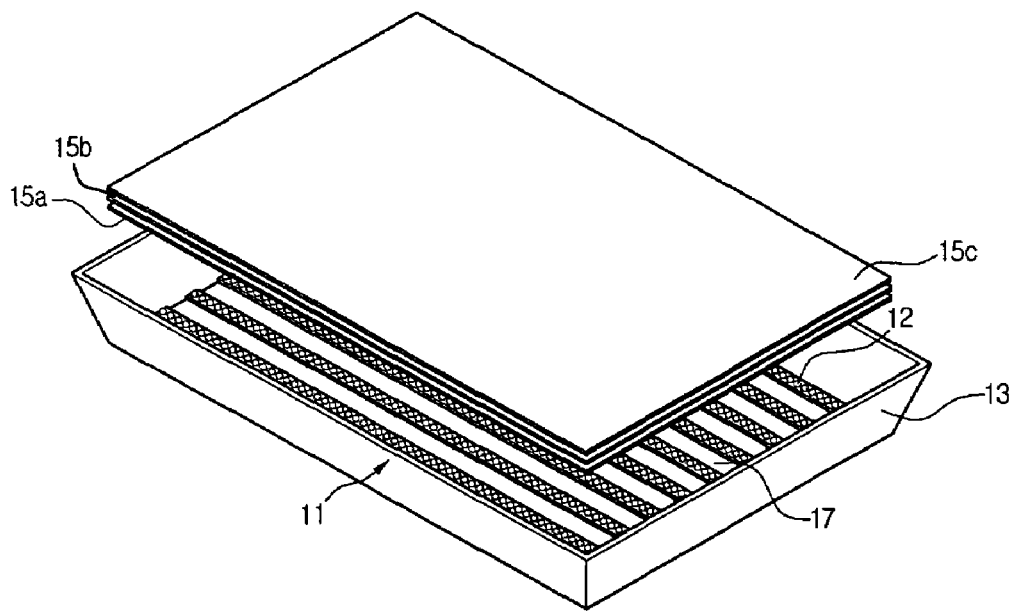
FIG. 2 is an exploded perspective view of a related art backlight unit with R, G and B LEDs.
Figure 3:
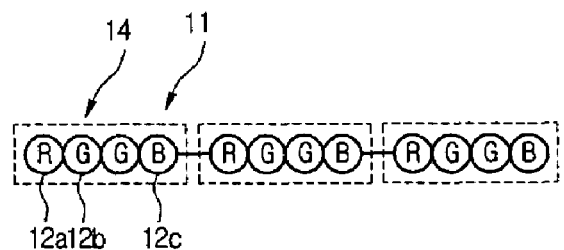
FIG. 3 is a view of the related art light source illustrated in FIG. 2.
Figure 4:
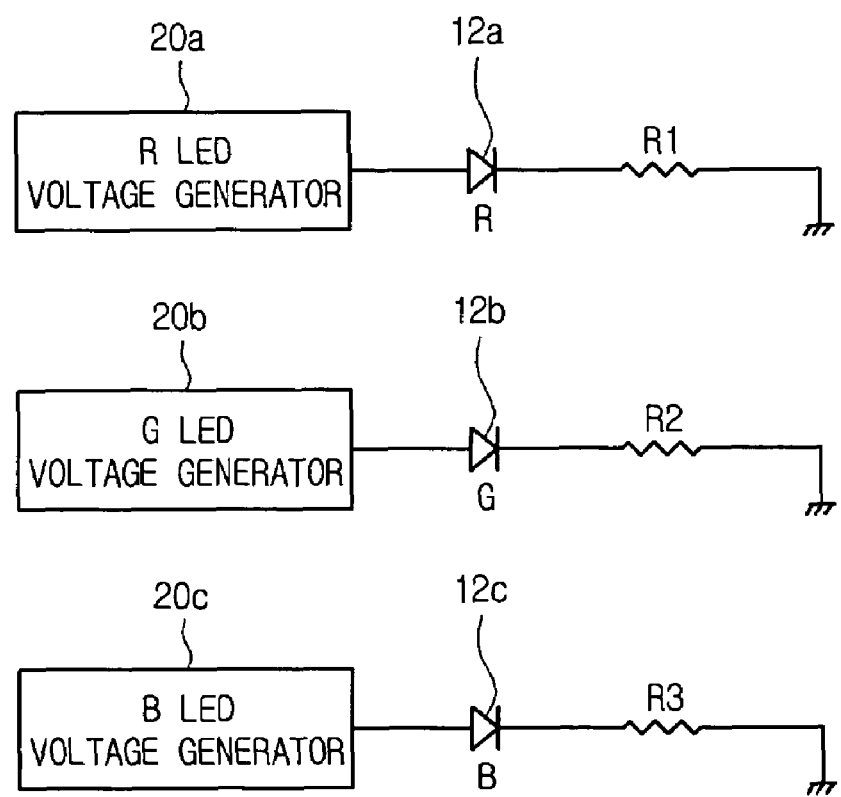
FIG. 4 is a circuit diagram of a driver for driving the related art LED emitting package illustrated in FIG. 3.

Even if the same amount of the current is supplied to the R, G and B LEDs 112a, 112b and 112c, the amount of the light emitted from the R, G and B LEDs 112a, 112b and 112c are different. In other words, even if the R, G and B LEDs 112a, 112b and 112c connected in series are driven by the same amount of the current, they have different brightness. Therefore, the R, G, and B LEDs 112a, 112b and 112c connected in series cannot emit a required white light. As a result, to emit the required white light, the R, G and B LEDs 112a, 112b and 112c must be driven individually as illustrated in FIG. 4.

Figure 7:
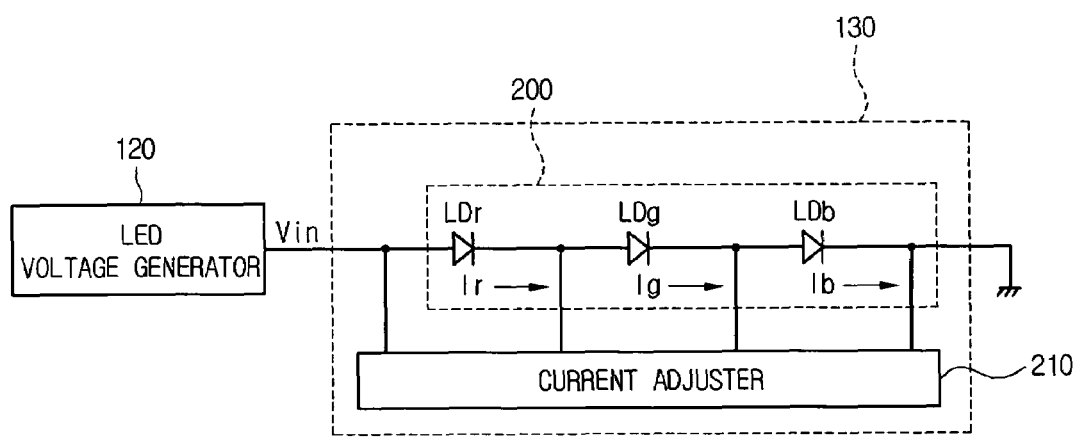
FIG. 7 is a circuit diagram of a light emitting package according to an embodiment.

FIG. 7 is a view illustrating the light source of the backlight unit containing the light emitting package according to an embodiment of the present invention. Referring to FIG. 7, the light source of the backlight unit includes a light emitting package 130 connected to the LED voltage generator 120. The light emitting package 130 includes an LED serial circuit 200 responsive to the input voltage Vin from the LED voltage generator 120. The LED serial circuit 200 includes R, G and B LEDs LDr, LDg and LDb connected in series between the output terminal of the LED voltage generator 120 and the ground terminal GND. The R, G and B LEDs LDr, LDg and LDb connected in series to the LED voltage generator 120 commonly respond to the input voltage Vin from the LED voltage generator 120. Also, the R, G and B LEDs LDr, LDg and LDb emit the light corresponding to the amount of the current supplied thereto.

The light emitting package 130 includes a current adjuster 210 for adjusting an amount of the current flowing through the R, G and B LEDs LDr, LDg and LDb of the LED serial circuit 200 respectively. The current adjuster 210 may be manufactured in a single module integrated with the LED serial circuit 200, or may be manufactured separately from the LED serial circuit 200. The current adjuster 210 adjusts an amount of the respective current flowing through the R, G and B LEDs LDr, LDg and LDb to emit the R, G and B light of the white light.

Since the amount of the current flowing through the R, G and B LEDs LDr, LDg and LDb is differently adjusted by the current adjuster 210, the R, G and B LEDs LDr, LDg and LDb can emit the R light, the G light, and the B light, thereby forming the required white light. Also, the R, G and B LEDs LDr, LDg and LDb connected in series emit the R light, the G light, and the B light commonly in response to the input voltage Vin.

Accordingly, unlike the related art in which a plurality of LED voltage generators have been used, the light emitting package uses only one LED voltage generator and simplifies additional circuits such as a controller for controlling the LED voltage generator. In addition, the light emitting package of the present invention can reduce the manufacturing cost of the LCD and the backlight unit. Further, the manufacturing process can be simplified and the volume of the light source of the backlight unit can be reduced.

Figure 8:
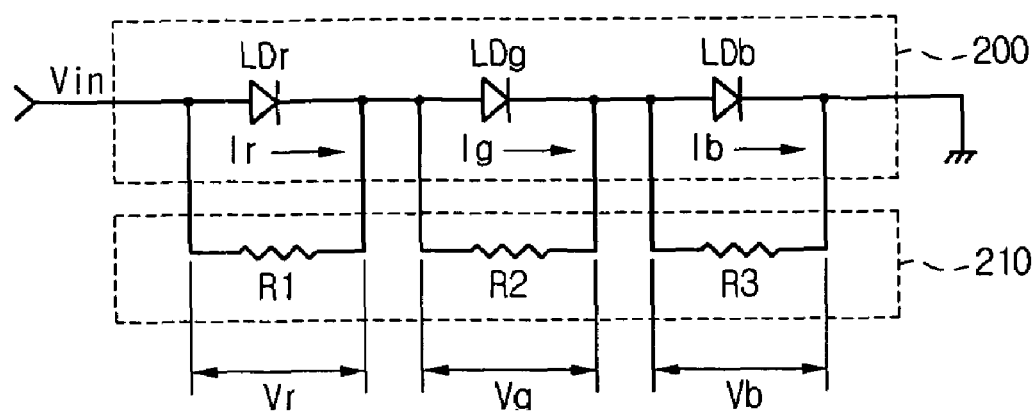
FIG. 8 is a detailed circuit diagram of the light emitting package according to the embodiment, for explaining an embodiment of the current adjuster shown in FIG. 7.

FIG. 8 is a circuit diagram of the light emitting package according to an embodiment of the present invention, for explaining an example of the current adjuster 210 in FIG. 7. The current adjuster 210 of the light emitting package 130 includes first to third resistors R1 to R3 connected in parallel to the R, G and B LEDs LDr, LDg and LDb of the LED serial circuit 200. Specifically, the first resistor R1 is connected in parallel to the R LED LDr, the second resistor R2 is connected in parallel to the G LED LDg, and the third resistor R3 is connected in parallel to the B LED LDb.

Currents Ir, Ig and Ib flowing through the R, G and B LEDs LDr, LDg and LDb connected in parallel to the first to third resistors R1 to R3 may be different from one another because some of the currents Ir, Ig and Ib flowing through the R, G and B LEDs LDr, LDg and LDb are bypassed through the resistors R1 to R3. Therefore, the first to third resistors R1 to R3 change the currents Ir, Ig and Ib flowing through the R, G and B LEDs LDr, LDg and LDb, so that the R, G and B LEDs LDr, LDg and LDb emit the R, G and B light for the white light. In other words, the different currents may be supplied to the R, G and B LEDs LDr, LDg and LDb through the first to third resistors R1 to R3, such that the R, G and B LEDs LDr, LDg and LDb emit the same amount of light (that is, the same brightness).

To emit the R, G and B light such that the R, G and B LEDs LDr, LDg and LDb can emit the required white light, the first to third resistors R1 to R3 have different resistance. In this case, the different currents flow through the R, G and B LEDs LDr, LDg and LDb connected in parallel to the first to third resistors R1 to R3. Specifically, the current Ir flowing through the R LED LDr is different from the current Ig and the current Ib flowing through the G LED LDg and the G LED LDb. As described above, the R, G and B LEDs LDr, LDg and LDb of the LED serial circuit 200 emit the light according to the amount of the current flowing through them (that is, the brightness).

Each resistance of the first to third resistors R1 to R3 are set to have a ratio based on the difference of the device characteristic so that the R, G and B LEDs LDr, LDg and LDb can emit the same brightness. For example, it is assumed that the brightness of the R LED LDr is 100, the brightness of the G LED LDg is 150, the brightness of the B LED LDb is 200, and the white light having their combined brightness is required. The ratio of the resistances of the first to third resistors R1 to R3 increase as it goes from the first resistor R1 to the third resistor R3.

Also, the resistances of the first to third resistors R1 to R3 are set according to the ratio based on the balance of the R, G and B light. For example, it is assumed that the formation of the white light requires the R LED LDr with the brightness of 100, the G LED LDg with the brightness of 150, and the B LED LDb with the brightness of 200.

The ratio of the resistances of the first to third resistors R1 to R3 are set to decrease as it goes from the first resistor R1 to the third resistor R3.

Like this, the resistances of the first to third resistors R1 to R3 are set to an appropriate ratio based on the difference of the characteristics of the R, G and B LEDs LDr, LDg and LDb and the white balance for forming the white light. The first to third resistors R1 to R3 whose ratio of the resistances satisfies the difference of the characteristics of the R, G and B LEDs LDr, LDg and LDb and the white balance are connected in parallel to the R, G and B LEDs LDr, LDg and LDb. Therefore, the R, G and B LEDs LDr, LDg and LDb can emit the R, G and B light, which can form the white light, by commonly responding to the input voltage Vin from the LED voltage generator 120.

Accordingly, unlike the related art in which a plurality of LED voltage generators have been used, the light emitting package uses only one LED voltage generator and simplifies additional circuits such as a controller for controlling the LED voltage generator. In addition, the light emitting package of the present invention can reduce the manufacturing cost of the LCD and the backlight unit. Further, the manufacturing process can be simplified and the volume of the light source of the backlight unit can be reduced.

Figure 9:
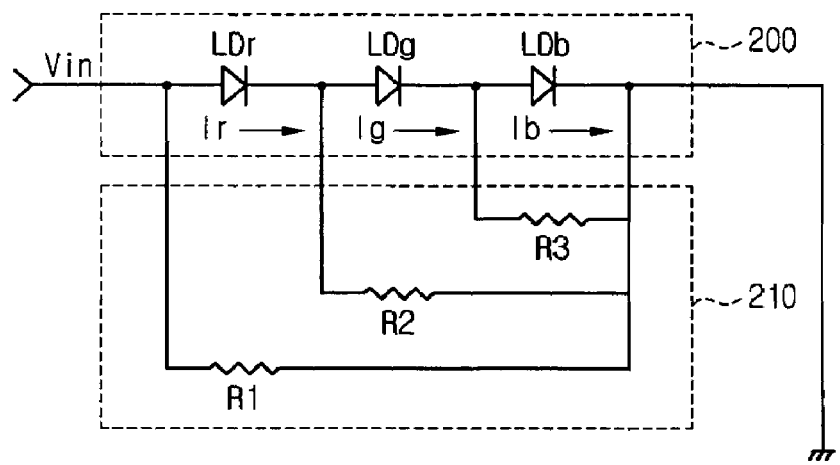
FIG. 9 is a detailed circuit diagram of the light emitting package according to the embodiment, for explaining an another embodiment of the current adjuster shown in FIG. 7.

FIG. 9 is a circuit diagram of the light emitting package according to another embodiment of the present invention, for explaining another example of the current adjuster 210 in FIG. 7. A current adjuster 210 of the light emitting package 130 includes first to third resistors R1 to R3 connected in parallel to the LED serial circuit 200 in a loop shape where an overlapping length is gradually shortened. The first resistor R1 is connected in parallel to the serial circuit of the R. G and B LEDs LDr, LDg and LDb, the second resistor R2 is connected in parallel to the serial circuit of the R, G and B LEDs LDg and LDb, and the third resistor R3 is connected in parallel to the B LED LDb alone. In other words, the B LED LDb forms a triple parallel circuit together with the first to third resistors R1 to R3, the G LED LDg is a dual parallel circuit together with the first and second resistors R1 and R2, and the R LED LDr forms a parallel circuit together with the first resistor R1.

The current adjuster 210 having the first to third resistors R1 to R3 connected in parallel to the LED serial circuit 200 so as to form the loops whose overlapping length is shortened can adjust step-by-step the amount of the current to be supplied to the R, G and B LEDs LDr, LDg and LDb according to the difference of the device characteristics and the white balance. In this case, the R, G and B LEDs LDr, LDg and LDb are connected to form a multiple parallel circuit together with the first to third resistors R1 to R3.

Assuming that the device characteristic of the R LED LDr is poorer than them of the G and B LEDs LDg and LDb and the G LED LDg is poorer than the B LED LDb in the device characteristic, the connection patterns of the first to third resistors R1 to R3 and the LED serial circuit 200 in FIG. 9 may have the current adjuster 210 in FIG. 9. The arrangement of the R, G and B LEDs LDr, LDg and LDb may be changed according to their each characteristic. Therefore, it will be apparent to those skilled in the art that the positions of the R, G and B LEDs LDr, LDg and LDb may be changed.

Among the resistors of the current adjuster 210, the first resistor R1 is adjusted to appropriately set the amount of the current Ir flowing through the R LED LDr. Also, the resistance of the first resistor R1 may be adjusted to appropriately set the amount of the current flowing through the LED serial circuit 200. The resistance of the second resistor R2 is adjusted to appropriately set the amount of the current Ig flowing through the G LED LDg within a range less than the amount of the current Ir flowing through the R LED LDr. The resistance of the third resistor R3 may be adjusted to appropriately set the amount of the current Ib flowing through the G LED LDb within a range less than the amount of the current Ig flowing through the G LED LDg.

Using the first to third resistors R1 to R3, the currents Ir, Ig and Ib flowing through the R, G and B LEDs LDr, LDg and LDb may be gradually decreased so as to satisfy the difference of the device characteristics and the required white balance. Accordingly, the R, G and B LEDs LDr, LDg and LDb can emit the R, G and B light, which form the white light, by commonly responding to the input voltage Vin from the LED voltage generator 120.

As a result, the light emitting package of the present invention can easily adjust the white balance based on the R, G and B light by the gradual current adjustment. Accordingly, unlike the related art in which a plurality of LED voltage generators have been used, the light emitting package uses only one LED voltage generator and simplifies additional circuits such as a controller for controlling the LED voltage generator. In addition, the light emitting package of the present invention can reduce the manufacturing cost of the LCD and the backlight unit. Further, the manufacturing process can be simplified and the volume of the light source of the backlight unit can be reduced.

Figure 10:
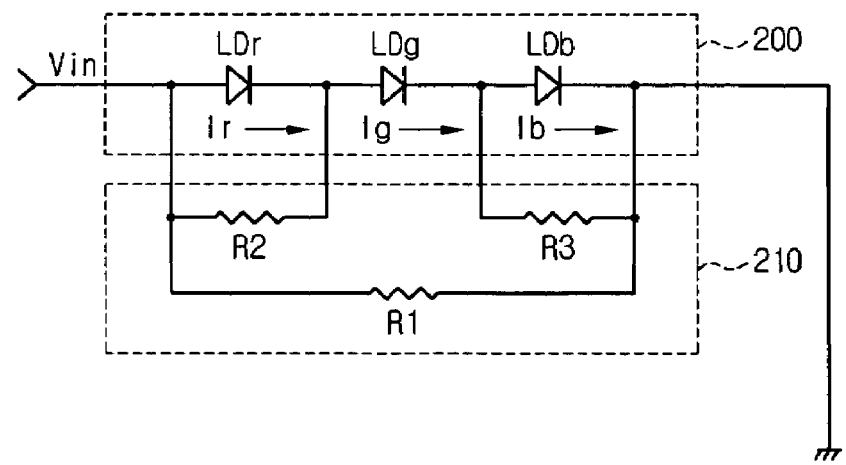
FIG. 10 is a detailed circuit diagram of the light emitting package according to the embodiment, for explaining a further embodiment of the current adjuster shown in FIG. 7.

FIG. 10 is a circuit diagram of the light emitting package according to an embodiment of the present invention, for explaining another example of the current adjuster 210 in FIG. 7. The current adjuster 210 of the light emitting package 130 includes a serial circuit of R, G and B LEDs LDr, LDg and LDb contained in an LED serial circuit 200, and first, second and third resistors R1, R2 and R3 connected in parallel to the R, G and B LEDs LDr, LDg and LDb, respectively. That is, the R LED LDr forms a dual serial circuit together with the first and second resistors R1 and R2. Likewise, the B LED LDb forms a dual serial circuit together with the first and third resistors R1 and R3. On the other hand, the G LED LDg forms a serial circuit together with the first resistor R1 alone.

The resistance of the first resistor R1 is adjusted so as to control the amount of a current flowing through the G LED LDg. If the current Ig flowing through the G LED LDg is well-adjusted to form the required white light in a condition not having the G LED LDg, the first resistor R1 may not be included to the present embodiment. The resistance of the second resistor R2 is adjusted such that the amount of a current Ir flowing through the R LED LDr is less than the amount of the current Ig flowing through the G LED LDg. Likewise, the resistance of the third resistor R3 is adjusted such that the amount of a current Ib flowing through the B LED LDb is less than the amount of the current Ig flowing through the G LED LDg.

In this manner, each amount of the currents Ir and Ib flowing through the R and B LEDs LDr and LDb is adjusted based on the amount of the current Ig flowing through the G LED LDg because the green light greatly affects the brightness. In this regard, the resistance of the first resistor R1 may be adjusted to appropriately set the amount of the current Ig flowing through the G LED LDg and enhance the brightness, considering the difference of the device characteristics and the required white balance. After the amount of the current Ig flowing through the G LED LDg, the resistances of the second and third resistors R2 and R3 are adjusted such that the amount of the currents Ir and Ib flowing through the R and B LEDs LDr and LDb are less than the amount of the current Ig flowing through the G LED LDg. Accordingly, the R, G and B LEDs LDr, LDg and LDb can emit the R, G and B light, which form the required white light, by commonly responding to the input voltage Vin from the LED voltage generator 120.

As a result, the light emitting package of the present invention can emit the required white light. Accordingly, like the related art in which a plurality of LED voltage generators have been used, the light emitting package uses only one LED voltage generator and simplifies additional circuits such as a controller for controlling the LED voltage generator. In addition, the light emitting package of the present invention can reduce the manufacturing cost of the LCD and the backlight unit. Further, the manufacturing process can be simplified and the volume of the light source of the backlight unit can be reduced.

Figure 11:
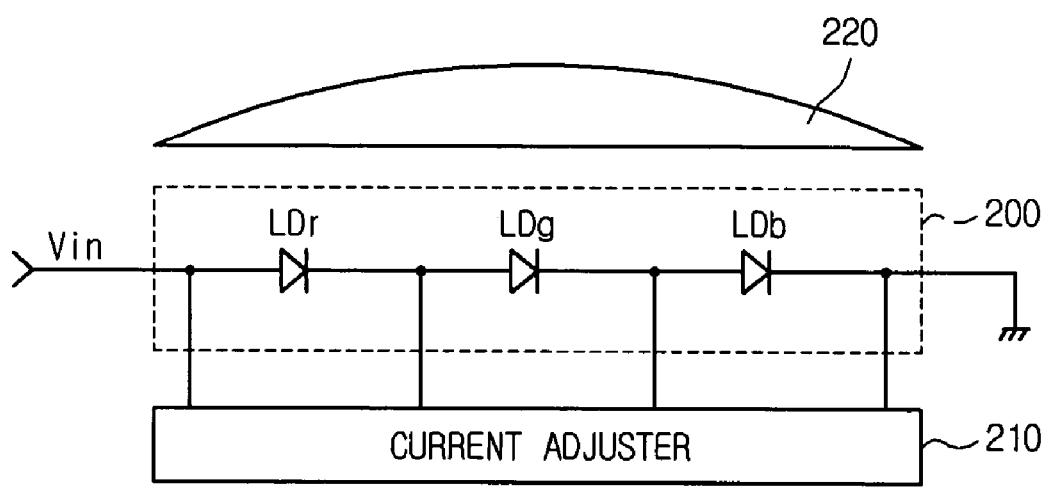
FIG. 11 is a circuit diagram of a light emitting package according to a further embodiment.

FIG. 11 illustrates a light emitting package 130 according to another embodiment of the present invention. Referring to FIG. 11, the light emitting package 130 is substantially identical to the light emitting package of FIG. 7, except that an LED 220 lens is disposed over an LED serial circuit 200. In FIG. 11, since the same reference numerals and signs will be used to refer to the same or like parts as in FIG. 7, their detailed description will be omitted for conciseness.

The LED serial circuit 200 includes R, G and B LEDs LDr, LDg and LDb that commonly respond to the input voltage Vin from the LED voltage generator 120. It will be apparent to those skilled in the art that a current adjuster 210 for adjusting the amount of currents flowing through the R, G and B LEDs LDr, LDg and LDb can be implemented in the same manner as in FIGS. 8 to 10.

The LED lens 220 provides the white light effect by condensing and mixing the R, G and B light emitted from the R, G and B LEDs LDr, LDg and LDb of the LED serial circuit 200. Also, the LED lens 220 can protect the current adjuster 210 as well as the LED serial circuit 200 having the R, G and B LEDs LDr, LDg and LDb from the external impact. Further, the LED lens 220 can prevent the R, G and B LEDs LDr, LDg and LDb from being contaminated from the foreign particles.

The LED lens 220 may be integrally formed with the LED serial circuit 200 and the current adjuster 210. Unlike this structure, the LED lens 220 may be integrally formed with the LED serial circuit 200 except the current adjuster 210.

As described above, by making the different currents flow through the R, G and B LEDs, the R, G and B LEDs of the light emitting package can emit the R, G and B light, which form the white light, by commonly responding to the single voltage Vin. Accordingly, unlike the related art in which a plurality of LED voltage generators have been used, the light emitting package uses only one LED voltage generator and simplifies additional circuits such as a controller for controlling the LED voltage generator. In addition, the light emitting package of the present invention can reduce the manufacturing cost of the LCD and the backlight unit. Further, the manufacturing process can be simplified and the volume of the light source of the backlight unit can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A light emitting package comprising:
red, green and blue light emitting diodes (LEDs) connected in series between an input terminal for supplying a voltage and a ground terminal, the red LED being connected to the input terminal, and the blue LED being connected to the ground terminal; and
a current adjuster coupled with the LEDs, the current adjuster including first to third resistors,
wherein the first resistor is connected between the input terminal and a first node between the red and green LEDs, the second resistor is connected between the first node and a second node between green and blue REDs, and the third resistor is connected between the second node and the ground terminal.

2. A light emitting package comprising:
red, green and blue light emitting diodes (LEDs) connected in series between an input terminal for supplying a voltage and a ground terminal, the red LED being connected to the input terminal, and the blue LED being connected to the ground terminal; and
a current adjuster including first to third resistors coupled with the LEDs,
wherein the first resistor is connected between the input terminal and the ground terminal, the second resistor is connected between a first node between the red and green LEDs and the ground terminal, and the third resistor is connected between a second node between the green and blue LEDs and the ground terminal.

3. The light emitting package according to claim 1, wherein respective resistors of the plurality of resistors have a different resistance from one another for establishing a white balance.

4. The light emitting package according to claim 1, wherein ratios of resistance values for the first resistor, the second resistor, and the third resistor are established to ensure the amount of light emitted from the red LED, the green LED and the blue LED is about the same.

5. The light emitting package according to claim 1, wherein respective resistors of the plurality of resistors have a resistance value established to control the current flowing through the associated one of the LEDs.

6. The light emitting package according to claim 5, wherein the resistance values are defined to equalize the amount of light emitted from each of the LEDs.

7. The light emitting package according to claim 1 further comprising a lens disposed on the LEDs.

8. A liquid crystal display device comprising:
a backlight unit including:
a plurality of circuit boards;
at least one light emitting package disposed on the plurality of circuit boards, the at least one light emitting package including light emitting diodes ("LEDs") connected in series between an input terminal for supplying a voltage and a ground terminal, the red LED being connected to the input terminal, and the blue LED being connected to the ground terminal and a current adjuster coupled with the LEDs, the current adjuster including first to third resistors; and
a liquid crystal panel for displaying an image by using a light generated from the backlight unit, wherein the first resistor is connected between the input terminal and a first node between the red and green LEDs, the second resistor is connected between the first node and a second node between green and blue REDs, and the third resistor is connected between the second node and the ground terminal.

9. A backlight unit comprising:

a voltage generator for generating an input voltage;

light emitting diodes ("LEDs") coupled with the voltage generator, wherein the LEDs are arranged in series between the voltage generator and a ground terminal and receive the input voltage, the red LED being connected to the voltage generator and the blue LED being connected to the ground terminal; and a current adjuster coupled with the LEDs, the current adjuster including first to third resistors, wherein the first resistor is connected between the input terminal and a first node between the red and green LEDs, the second resistor is connected between the first node and a second node between green and blue REDs, and the third resistor is connected between the second node and the ground terminal.

10. A light emitting package comprising:

red, green and blue light emitting diodes (LEDs) connected in series between an input terminal for supplying a voltage and a ground terminal, the red LED being connected to the input terminal, and the blue LED being connected to the ground terminal; and a current adjuster including first to third resistors coupled with the LEDs, wherein the first resistor is connected between the input terminal and the ground terminal, the second resistor is connected between the input terminal and a first node between the red and green LEDs, and the third resistor is connected between a second node between the green and blue LEDs and the ground terminal.

* * * * *